June 6, 1972     C. E. LOVE     3,667,802

COVERING STRUCTURE FOR VEHICLES

Filed Feb. 18, 1971     2 Sheets-Sheet 1

INVENTOR
CHARLES E. LOVE

BY
Dunlap, Laney, Hessin & Dougherty
ATTORNEYS

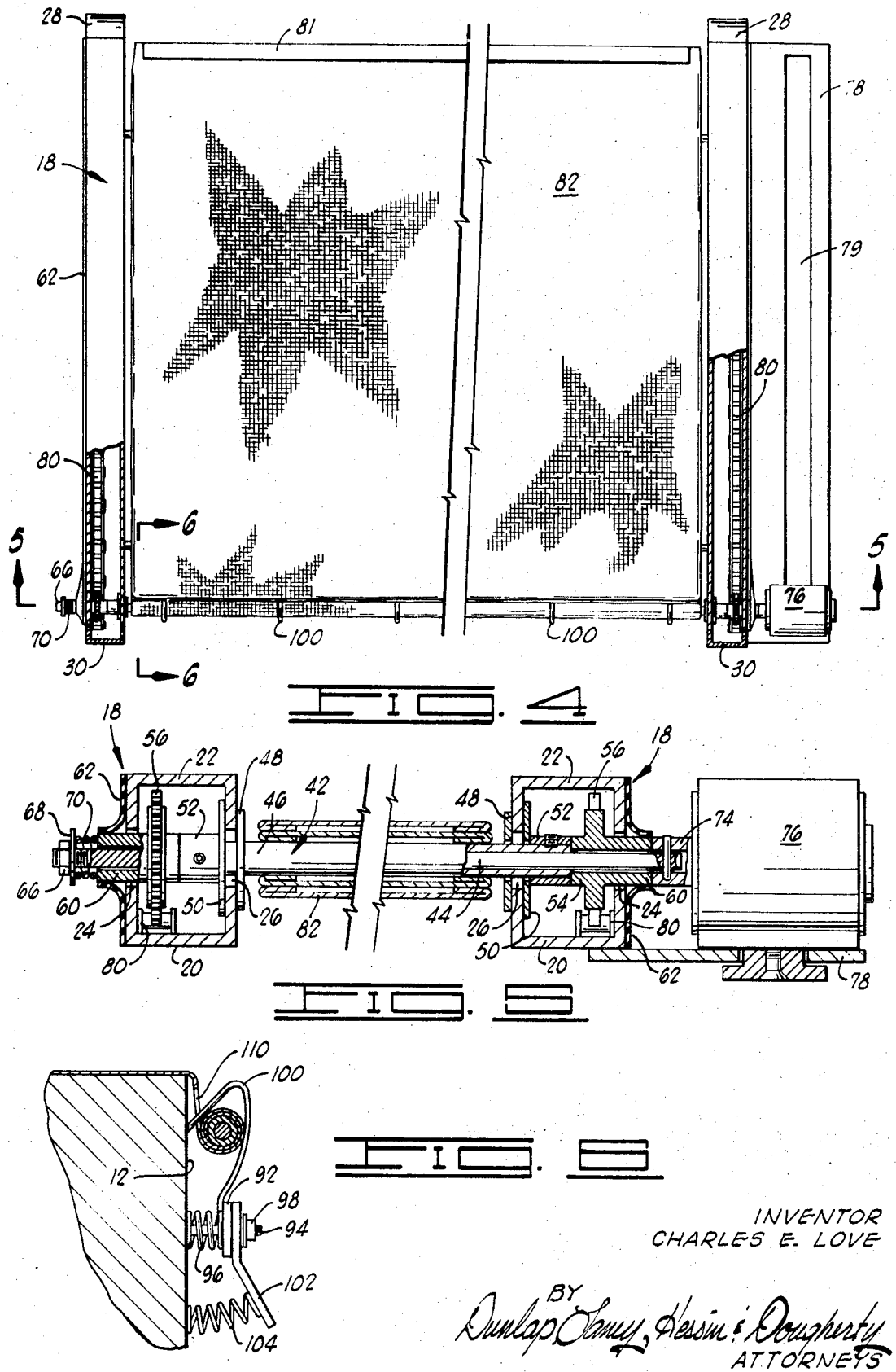

United States Patent Office 3,667,802
Patented June 6, 1972

3,667,802
COVERING STRUCTURE FOR VEHICLES
Charles E. Love, 4517 SE. 31st,
Del City, Okla. 73115
Filed Feb. 18, 1971, Ser. No. 116,421
Int. Cl. B60j 11/00
U.S. Cl. 296—98                                                 16 Claims

ABSTRACT OF THE DISCLOSURE

A covering structure for extending a tarpaulin over the cargo carried in a truck or trailer, including a pair of track supporting frames mounted for vertical movement on opposite sides of the bed of the truck, a pair of gear tracks mounted on said track supporting frames and extending along the sides of the bed of the truck, gears engaging the tracks on the track supporting structures, and a shaft interconnecting the gears through friction clutch elements which permit the shaft to rotate relative to the gears. A motor is drivingly connected to one end of the shaft and one edge of a tarpaulin is connected to the central portion of the shaft between the gears. When the gears are engaged through the clutches with the shaft, and the motor is energized, the tarpaulin can be rolled up to uncover the cargo in the bed of the truck or rolled out and extended across the cargo to protect it from inclement weather.

BACKGROUND OF THE INVENTION (1) Field of the invention

This invention relates to a structure for covering cargo carried in a truck or trailer, and more particularly, it relates to apparatus for automatically rolling out a tarpaulin to extend across the top of the bed of a truck or trailer to cover a cargo carried therein.

(2) Brief description of the prior art

Various types of coverings have been utilized for protecting cargo carried in truck beds and trailers from inclement weather, wind loss and the like. The simplest type of structure previously in use for this purpose has been a sheet of canvas or tarpaulin which is secured by ropes or flexible fasteners along the sides of the truck bed so that the edges extend downwardly along the sides, front and rear of the bed and completely cover the cargo. Positioning of the tarpaulin has been effected manually.

There have also been proposed more recently, various types of covering mechanisms and devices for covering the open tops of trailers and truck beds where it is undertaken to extend the tarpaulin to its covering position automatically, and using a power drive to activate the tarpaulin. Devices of this type are shown in Thompson et al. U.S. Pat. 3,366,414; Cox U.S. Pat. 3,488,087 and Amerine U.S. Pat. 2,967.733.

In the Amerine patent, a canvas tarpaulin is anchored along one edge to the side of the truck bed and is rolled upon a shaft which extends across the truck bed. The ends of the shaft are extended through slots in rails which are provided along the upper edges of the sidewalls of the truck bed. The shaft carries at its ends, sprockets which mesh with chains mounted in the rails. The shaft is rotated by cables which extend over pulleys carried on one end of the shaft. As the tarpaulin is extended, it lies in substantially the same plane as that occupied by the shaft across the top of the truck bed.

BRIEF DESCRIPTION OF THE PRESENT INVENTION

The present invention provides a structure for protectively covering the open top of a truck bed, trailer or railroad car with a flexible protective member such as a tarpaulin or canvas. The structure includes floating track elements which permit the tarpaulin to move upwardly as may be required to accommodate the humps or high places in the cargo covered, where the cargo extends above the upper edges of the sides of the bed of the truck. The truck also includes means to assure that the tarpaulin is not ripped or torn, and that it unrolls evenly from side to side across the top of the truck bed.

Broadly described, the covering structure of the present invention comprises a pair of elongated, track supporting assemblies; means for movably mounting the track supporting assemblies on opposite sides of the bed of a truck or the like for free vertical movement; an elongated gear track carried on each of said track supporting assemblies; and a gear engaging each of said tracks for movement therealong as the gears are rotated. An elongated shaft is extended between said track supporting assemblies and through said gears. Clutch means are provided on opposite ends of the shaft for frictionally engaging the gears with the shaft.

A flexible covering means is included which has one edge adapted for securement to the sides of a truck bed, and which has a second edge connected to the shaft along the length thereof for rolling upon the shaft. In a preferred embodiment of the invention, the covering structure further includes a latching assembly adapted for securement to a side wall of a truck bed or the like for latching the shaft in a position along such side wall after the flexible covering means has been extended across the top of the truck bed.

An object of the invention is to provide a covering structure for automatically extending a tarpaulin or the like across the top of the bed of a pick-up truck or trailer in such a way that humps or high places in the cargo carried therein may be covered by the tarpaulin.

An additional object of the invention is to provide a mechanism for extending a flexible covering material across the top of a truck bed or the like to tightly cover a cargo, and to retain the covering structure in a latched status until it is to be released.

An additional object of the invention is to provide a mechanism for automatically extending a tarpaulin across a cargo carried in a truck or the like, which mechanism is mechanically reliable and is characterized in having a long and trouble free operating life.

Additional objects and advantages of the invention will become apparent as the following detailed description of a preferred embodiment of the invention is read in conjunction with the accompanying drawings which illustrate the invention.

BRIEF DESCRIPTION OF THE DRAWINGS

FIG. 4 is a plan view of the trailer bed and covering structure of the invention depicted in FIG. 1.

FIG. 5 is a sectional view taken along line 5—5 of FIG. 4.

FIG. 6 is a sectional view taken along line 6—6 of FIG. 4.

BRIEF DESCRIPTION OF THE EMBODIMENT OF THE INVENTION

Figure 1:
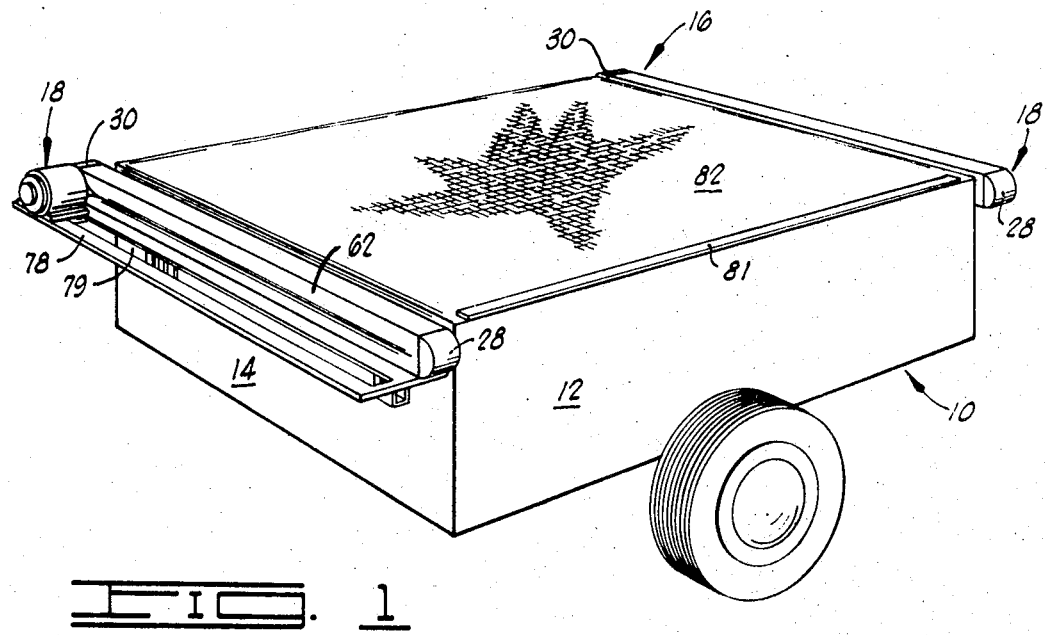
FIG. 1 is a perspective view of the cargo carrying bed of a two wheeled trailer showing the covering structure of the present invention mounted thereon with a tarpaulin extended across and covering the open top of the trailer bed.

Referring initially to FIG. 1 of the drawings, shown therein is a two wheeled trailer 10 upon which the covering structure of the present invention is mounted. The trailer includes a pair of side walls 12 and a pair of end walls 14, and is of generally rectangular parallelepiped configuration. The trailer is open at the top and is adapted to carry cargoes of varying types. It is frequently desirable to cover this cargo with a protective covering, and to this end, a tarpaulin is often provided which is secured across the top of the trailer.

The covering structure of the present invention is designated generally by reference numeral 16 and includes a pair of elongated track supporting assemblies, each designated generally by reference numeral 18. The track supporting assemblies 18 are disposed at opposite ends of the trailer 10, and are mounted on the end walls 14. The mounting of the assemblies 18, as will be hereinafter explained, is a movable or floating mounting so that each of the assemblies can move vertically with respect to the trailer, and each of the assemblies can, to a limited extent, pivot about a horizontal axis so as to be canted or inclined with respect to the horizontal.

Referring in greater detail to the construction of each of the track supporting assemblies 18, each assembly includes an elongated, generally rectangular housing, which includes a lower, C-shaped portion 20 and an upper C-shaped portion 22. An elongated slot 24 is provided on the outside wall of each of the housings, and a similar elongated slot 26 is provided on the inside wall of each of the housings. A pair of arcuate end walls 28 and 30 close the opposite ends of each of the housings to protect the interior thereof from infiltration of dust, water and the like. Preferably, the end walls 28 and 30 are made detachable from the housings, and the top wall 22 and the bottom wall 20 of each housing are each preferably made as a separate part which can be joined to the other to form the housing.

Figure 2:
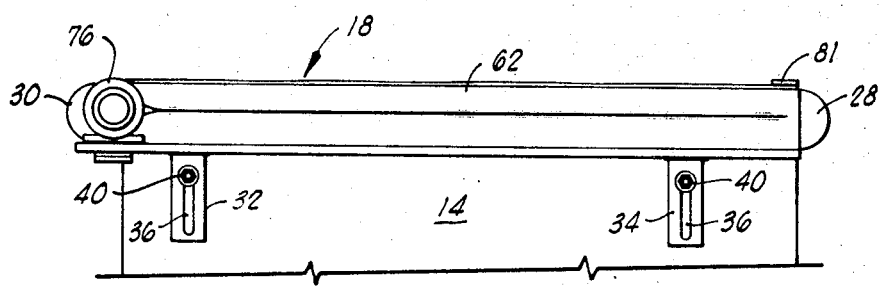
FIG. 2 is an elevational view of a portion of the structure of the present invention showing one of the track supporting assemblies forming a portion of the present invention.
Figure 3:
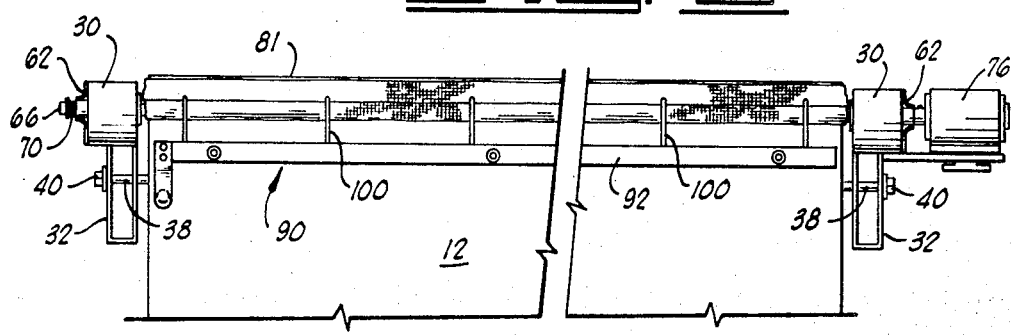
FIG. 3 is a view in elevation of the upper portion of the trailer bed with the present invention mounted thereon as the covering structure of the invention appears when the tarpaulin is latched in its covering position.

Projecting downwardly from the under side of the lower portion 20 of each of the housings are a pair of elongated mounting brackets 32 and 34 (see FIGS. 2 and 3). Each of the mounting brackets 32 and 34 is provided with an elongated slot 36 through which extends a mounting bolt 38 carrying at its outer end a nut 40. From this arrangement, it will be seen that the track supporting assemblies 18 may each move upwardly and downwardly relative to the bed of the trailer 10 and in undergoing such movement, a slight canting in two planes to provide angulation with respect to the horizontal may also be accomplished.

Extending across the top of the trailer 10 between the two track supporting assemblies 18 is an elongated shaft assembly 42. The shaft assembly 42 includes an internal, elongated solid shaft 44 which projects through a hollow cylindrical sleeve 46. The sleeve 46 projects through the slots 26 in the inside wall of each of the housings of the track supporting assemblies 18 and is free to rotate upon the shaft 44. Large protective washers 48 extend around the sleeve 46 adjacent the inner wall of each of the housings of the track supporting assemblies. Additional washers 50 are provided inside each of the housings of the track supporting assemblies 18 adjacent the inside wall thereof in a position surrounding the sleeve 46.

At its end inside each of the housings of the track supporting assemblies 18, the sleeve 46 has keyed thereto a pair of friction clutch elements 52 which bear at one end against the respective washers 50. The friction clutch elements 52 are rotatable with the sleeve 46 and are in contact with a hub portion 54 of an annular gear 56 which surrounds the shaft 44 and which includes a second hub portion 60. The two gears 56 are mounted on opposite ends of the shaft 44, and the hubs 56 thereof extend through the slots 24 in the outer sides of the track supporting assemblies 18.

To further seal the interior of the housings of the track supporting assemblies against infiltration of moisture and dirt, a pair of slotted sheets 62 of elastomeric material are secured to the outside walls of the housings of the track supporting assemblies 18, and have edges which bear resiliently and sealingly against the hub portions 60 of the gears 56 where these hub portions project outwardly from the housings of the track supporting assemblies. These edges of the sheets 62 meet along a centerline opposite the slot 24 in the outside wall of the housings of the track supporting assemblies 18 (see FIG. 2) to seal the housing and yet permit translational movement of the shaft means 42 and the gears 56 which are mounted thereon along the housings of the track supporting assemblies.

At one of its ends, the shaft 44 carries an adjusting nut 66 which bears against a washer 68 forming a stop for a friction clutch spring 70. The friction clutch spring 70 bears against the outer end of the hub portion 60 of one of the gears 56 so that there is a frictional interconnection between the shaft 44 and the gear 56 through the nut 66 and spring 70. It will further be perceived that, as the nut 66 and the washer 68 in contact therewith are moved inwardly on the shaft 44 from the outer end thereof, the spring 70 is biased more forcefully against the hub portion 60 of the gear 56 adjacent that end of the shaft 44. This gear 56 is thus biased by the spring 70 into firmer frictional contact with the adjacent friction clutch element 52 which is keyed to the sleeve 46. The frictional driving engagement between the hub portion 54 of the gear 56 and the friction clutch element 52 is thus enhanced or increased by moving the nut 66 and washer 68 inwardly on the shaft 44. Conversely, by moving the nut 66 and washer 68 outwardly on the shaft 44, there is reduced frictional engagement between the hub portion 54 and the friction clutch element 52 so that relative movement between the gear 56 and the friction element 52 occurs more easily.

At the end of the shaft 44 opposite the end which carries the nut 66, this shaft is keyed to the output shaft 74 of an electric motor 76. The electric motor 76 is slidably supported on an elongated motor track plate 78 which has a longitudinally extending slot 79 positioned centrally therein. Suitable bearings (not shown) may be positioned between the motor 76 and the motor track plate 78 to permit the motor to move more easily along this track plate. The motor also, by virtue of the method of mounting it on the track plate 78, can undergo some movement toward and away from the adjacent housing of the nearest track supporting assembly 18. Stated differently, the motor 76 may undergo some slight movement on the track plate in an axial direction with respect to the shaft 44. It will thus be seen that when the adjusting nut 66 disposed at one end of the shaft 44 is screwed inwardly on this shaft to place the spring 70 in greater compression, the effect of such movement is also to pull the motor 76 keyed to the shaft 44 inwardly with respect to the overall length of this shaft, and to thus cause the frictional engagement to be increased between the hub portion 54 of the gear 56 nearest the motor and the adajcent friction clutch element 52. The overall effect, then, of screwing the nut 66 inwardly on the shaft 44 is to increase the extent to which each of the gears 56 is drivingly engaged with the friction clutch elements 52, and therefore with the sleeve 46 carried on the outer periphery of the shaft 44.

As shown in FIGS. 4 and 5, an elongated track 80 is mounted within each of the housings of the track supporting assemblies 18 with the location of the tracks being on the upper sides of the walls of the lower portions 20. The tracks 80 utilized in the illustrated embodiment of the invention are bicycle chain-type tracks which are engageable by gears 56 which are similar to the sprockets used in bicycles. Thus, the teeth of the gears 56 will engage the tracks 80, and when the gears are rotated, the shaft assembly 42 will move transversely across the open upper side of the trailer 10.

A tarpaulin 82 is utilized for covering the open upper side of the trailer 10. The trapaulin has one side edge permanently secured by a strip of metal 81 or other suitable means to the upper edge of one side wall 12 of the trailer, and has another side edge wrapped around and connected to the sleeve 46 which surrounds the shaft 44. By reason of its connection to the sleeve 46, when this sleeve is rotated, the tarpaulin will be wound or unwound from the sleeve.

In the status of the covering structure of the invention as it is illustrated in the drawings, the tarpaulin 82 has been unwound from the sleeve 46 and extended across the trailer 10 to cover the open upper side thereof. After the tarpaulin 82 has been extended across the top of the trailer 10, the central portion of the shaft assembly 42 drops down along the side wall 12 as depicted in FIG. 3, and is engaged by a latching assembly designated generally by reference numeral 90. The latching assembly 90 includes an elongated strip 92 of metal or other rigid material which is retained in position on the side wall 12 of the trailer by means of elongated bolts 94. The bolts 94 extend through springs 96 mounted between the strap 92 and the side wall of the trailer. Nuts 98, threaded on the bolts 94, maintain the strip 92 against the springs 96. This mounting arrangement permits the strap 92 to be canted or angled with respect to the vertical for a purpose hereinafter described.

At longitudinally spaced intervals along the strip 92, a plurality of hook-shaped retainer fingers 100 are provided, and are at one end secured to the strap. At the other end of the fingers are extended upwardly and curved back toward the adjacent side wall 12 of the trailer (see FIG. 6). At one end of the strip 92, a lever plate 102 is secured to the strip, and has a free end bearing against a spring 104 which biases the lever outwardly from the trailer.

OPERATION

In the operation of the covering structure of the invention, the tarpaulin 82 may be assumed to be initially wrapped upon the sleeve 46 of the shaft assembly 42 so that the tarpaulin is retracted and is positioned in its rolled up status along the side wall 12 of the trailer 10 which carries the securing strip 81. In this uncovered position, the trailer may be loaded with any type of cargo which it may be desired to carry therein.

When the trailer has been loaded, the motor 76 is energized and the tarpaulin 82 is extended across the cargo to cover it and protect it from wind, dust, rain and snow. As the motor 76 is energized, the shaft 44 is driven in rotation by the motor. The adjusting nut 66 carried at one end of the shaft 44 has previously been adjusted in its axial setting on the shaft 44 so that sufficient frictional engagement is maintained between the gears 56 and the friction clutch elements 52 that the turning of the gears 56 will also cause the sleeve 46 to undergo rotation.

Thus, energization of the motor 76 rotates both the gears and the sleeve 46 of the shaft assembly 42 so that the shaft assembly 42, the gears 56 and the motor 76 connected to the shaft 44 commence to travel transversely across the trailer. This travel is engendered by the driving engagement of the teeth of the gears 56 with the tracks 80. Since the pitch of the teeth of the gears 56 and the manner in which they engage the tracks 80 on opposite sides of the trailer are identical, both gears advance at the same rate of speed, and the shaft means 42 is maintained in proper alignment with the fore and aft axis of the trailer (that is substantially normal to the end walls 14).

As the motor 76 moves across the bed of the trailer 10, it is supported upon the motor support plate 78 and is guided by this plate. Movement across the trailer of the sleeve 46 with concurrent rotation of this sleeve causes the tarpaulin 82 to be unwound and extended across the top of the trailer. If a portion of the load or cargo within a trailer 10 projects above the top edges of the side walls 12 thereof, the tarpaulin 82 can move upwardly sufficiently to pass across and cover such protuberant portions of the cargo. This ability of the tarpaulin 82 to accommodate itself to varying geometric configurations of the cargo is made possible by the floating mounting of the track supporting assemblies 18. Thus, either of these assemblies 18 may move upwardly by a substantial amount as permitted by the length of the slots 36 in the mounting brackets 32 and 34 which support each of the assemblies. It will be noted in referring to FIGS. 2 and 3, that the particular manner of construciton of the mounting brackets 32 and 34 which support each of the track supporting assemblies 18 on the trailer 10, also permits these track supporting assemblies to be canted with respect to the vertical. It is thus possible for the track supporting assembly 18 at the forward seid of the trailer 10 to rise vertically to accommodate a hump in the cargo which is close to the forward end of the trailer while the track supporting assembly 18 at the rear of the trailer remains in its lowermost position, as depicted in the drawings.

After the motor 76 has driven the gears 56 to the ends of the tracks 80 which are adjacent the side 12 of the trailer which carries the latching assembly 90, the shaft means 42 can drop downwardly a slight distance below the upper edge of the side wall 12 of the trailer 10. This downward movement of the shaft assembly 42 will cause the sleeve 46 to come in contact with the curved upper end portion of the latching fingers 100. The configuration of these fingers 100 is such that the fingers may be wedged or biased outwardly by the downwardly moving shaft means 42 to permit the shaft means to pass under, and become hooked or engaged by the latching fingers. At the end of the tarpaulin 82 which is secured to the sleeve 46, the tarpaulin carries a series of narrow slots 110 to permit the latching fingers 100 to extend through these slots, as best illustrated in FIG. 6. Thus, after the latching fingers 100 have been pivoted outwardly to snap over the shaft assembly 42 as it moves downwardly along the side wall 12, the latching fingers extend through the slots 110 and the tarpaulin is drawn taut across the top of the trailer 10. At this point during the covering operation, any suitable type of limit switch may be provided to terminate the energization of the motor 76 or this may be accomplished manually.

It is to be noted that if the vertical bulge of the cargo is such that the tarpaulin 82 is extended to its full limit of travel before the motor 76 is denergized, the friction clutch assemblies provided in association with the motor 76, gears 56 and shaft assembly 42 will release the sleeve 46 so that it can turn freely on the shaft 44 and ripping of the tarpaulin will thus be avoided. The friction clutch assemblies also permit slippage of the gears 56 with respect to the shaft 44 at such time as rotational movement of the gears is terminated by arrival at the end of the tracks 80 and bearing of the gears against the end portion 28 and 30 of the housings of the track supporting assemblies 18. Translational movement of the gears 56, and consequently rotation thereof, may also be impeded by the arrival of the shaft assembly 42 at a limit of travel dictated by the length of the tarpaulin 82. Again, if the tarpaulin 82 is extended over a pronounced bulge so that its edge which is secured to the sleeve 46 arrives at its limit of travel prior to the time that the shaft assembly has reached the side wall 12 which carries the latching assembly 90, the gears 56 will again turn freely on the shaft 44, rather than being driven in rotation therewith.

To retract the tarpaulin 82 for the purpose of uncovering the cargo, the latching assembly 90 may be released by depressing the lever plate 102 against the spring 104 to release the latching fingers 100 from the shaft assembly 42. The motor 76 is then energized for rotation in the proper direction to wrap the tarpaulin upon the shaft assembly 42.

From the foregoing description of the invention, it will be perceived that the invention provides a covering structure which can be quickly and easily mounted on vehicles in a position to cover with a waterproof flexible covering member, a cargo carried in the bed of the vehicle. The covering structure may be relatively economically manufactured and is characterized in having a long and trouble free operating life. The over-all operation of the structure is semi-automatic in nature, and the apparatus may be effectively employed to cover cargos of irregular geometry which project upwardly above the upper side edges of the walls of the vehicle.

Although a preferred embodiment of the invention has been herein described in order to apprise those skilled in the art of the manner in which the invention is to be practiced, it will be understood that various changes and innovations can be effected in the described and illustrated structure without departure from the basic principles which underlie the invention. Changes and innovations of this type which continue to rely upon these principles are therefore deemed to be circumscribed by the appended claims or reasonable equivalents thereof.

What is claimed is:

1. A covering structure for protectively covering cargo carried in a vehicle comprising:
    a pair of elongated, track supporting assemblies;
    means for movably mounting the track supporting assemblies on opposite sides of said vehicle for free vertical movement on the vehicle;
    an elongated track carried on each of said track supporting assemblies, said tracks extending substantially parallel to each other;
    means for engaging each of said tracks for guided rotational movement therealong;
    elongated shaft means extended between said track engaging means and connected thereto for rotational and translational movement with said track engaging means;
    a flexible covering member having a first edge connected to said shaft means for rolling up said covering member on said shaft means as said shaft means is rotated, and having a second edge adapted for connection to said vehicle; and
    means for rotatably driving said track engaging means and shaft means to roll and unroll said flexible covering member on said shaft means.

2. A covering structure as defined in claim 1 and further characterized as including a latching assembly adapted for automatically latching said shaft means and flexible covering member to one side of side vehicle.

3. A covering structure as defined in claim 1 wherein each of said track engaging means comprises a gear having teeth engaging one of said tracks for positive driving movement therealong.

4. A covering structure as defined in claim 1 wherein each of said elongated track supporting assemblies comprises a housing having horizontally aligned slots in opposite sides thereof for receiving one end of said shaft means.

5. A covering structure as defined in claim 1 wherein said means for movably mounting the track supporting assembly on opposite sides of said vehicle comprises:
    a pair of horizontally spaced brackets secured to the underside of each of said track supporting assemblies and extending downwardly therefrom, said brackets each having a vertically extending slot formed therein; and
    elongated bolts extending loosely through said slots to permit vertical movement of the bolts relative to said brackets.

6. A covering structure as defined in claim 1 wherein said shaft means comprises:
    a solid shaft extending between said track engaging means;
    a sleeve rotatably surrounding said shaft and extending between said track supporting assemblies, said sleeve having said one edge of said flexible covering member connected thereto; and
    clutch means for drivingly engaging said driving means and said sleeve.

7. A covering structure as defined in claim 6 and further characterized as including a latching assembly adapted for automatically latching said shaft means and flexible covering member to one side of said vehicle.

8. A covering structure as defined in claim 7 wherein each of said track engaging means comprises a gear having teeth engaging one of said tracks for positive driving movement therealong.

9. A covering structure as defined in claim 8 wherein each of said elongated track supporting assemblies comprises a housing having horizontally alinged slots on opposite sides thereof for receiving said shaft through said slots.

10. A covering structure as defined in claim 9 wherein said means movably mounting the track supporting assembly on opposite sides of said vehicle comprises:
    a pair of horizontally spaced brackets secured to the underside of each of said housings and extending downwardly therefrom, said brackets each having an elongated, vertically extending opening therethrough; and
    elongated bolts extending loosely through said openings to permit vertical movement of the bolts relative to said brackets.

11. A covering structure as defined in claim 1 wherein said driving means comprises:
    a motor drivingly connected to said shaft means; and
    means for supporting and guiding said motor in substantially horizontal movement alongside one of said track supporting assemblies.

12. A vehicle for transporting cargo in a covered state comprising:
    an open-topped, rectangular cross-sectioned bed having side walls and end walls;
    wheels supporting said bed;
    first elongated track means movably mounted on one of the walls of the bed;
    second elongated track means movably mounted on another of the walls of the bed opposite and extending parallel to said first-mentioned wall;
    a first toothed gear engaging said first track means for rotational and translational movement therealong;
    a second toothed gear engaging said second track means for rotational and translational movement therealong;
    a shaft extending between said first and second toothed gears;
    a sleeve rotatably surrounding said shaft;
    adjustable friction clutch means drivingly interconnecting said shaft, said sleeve and said first and second toothed gears;
    a rectangular tarpaulin having an edge secured to said sleeve for rolling the tarpaulin upon the sleeve, and having another edge opposite and extending parallel to said first edge thereof, with said other edge secured to a sidewall of said bed extending normal to the walls of said bed upon which said first and second elongated track means are movably mounted; and
    means for selectively rotating said shaft in opposite directions.

13. A vehicle for transporting cargo as defined in claim 12 and further characterized to include latching fingers pivotedly secured to a side wall of said bed opposite the side wall to which said second edge of said tarpaulin is secured and positioned for detachably engaging said sleeve.

14. A vehicle for transporting cargo as defined in claim 12 wherein said means for selectively rotating said shaft comprises a motor drivingly connected to said shaft.

15. A vehicle for transporting cargo as defined in claim 12 wherein each of said track means comprises a chain having links therein for receiving the teeth of the respective toothed gears.

16. A vehicle for transporting cargo as defined in claim 12 wherein each of said track means is mounted on its respective wall of the bed for free vertical movement thereon.

References Cited
UNITED STATES PATENTS

| | | | |
|---|---|---|---|
| 2,510,307 | 6/1950 | Daniels | 296—100 |
| 2,976,082 | 3/1961 | Dahlman | 296—98 |
| 3,384,413 | 5/1968 | Sargent | 296—98 |
| 3,511,408 | 5/1970 | Hughes | 296—98 |
| 3,488,087 | 1/1970 | Cox | 296—100 |

BENJAMIN HERSH, Primary Examiner

R. R. SONG, Assistant Examiner

U.S. Cl. X.R.

296—100